United States Patent [19]

King

[11] Patent Number: 4,545,973
[45] Date of Patent: * Oct. 8, 1985

[54] COMPLEX METAL CHALCOGENIDES

[75] Inventor: James P. King, Lansdale, Pa.

[73] Assignee: Pennwalt Corporation, Philadelphia, Pa.

[*] Notice: The portion of the term of this patent subsequent to Aug. 14, 2001 has been disclaimed.

[21] Appl. No.: 502,787

[22] Filed: Jun. 9, 1983

[51] Int. Cl.$^4$ ............................................. C01B 17/45
[52] U.S. Cl. ................................. 423/512 R; 423/508; 423/511; 423/518; 423/593; 252/25; 252/46.4
[58] Field of Search ................... 423/511, 512 R, 518, 423/593, 508, 561 R; 252/25, 46.4

[56] References Cited

U.S. PATENT DOCUMENTS 4,465,604 8/1984 King .................................. 252/37.2

FOREIGN PATENT DOCUMENTS 1423641 of 1966 France .

OTHER PUBLICATIONS

M. J. Devine et al., "New Sulfide Addition Agents for Lubricant Materials", A.S.L.E. Transactions 11, 283-289, (1968).
S. M. Niazy et al., "EP and Anti-Wear Properties of Greases Containing a Complex Sulfide Additive", Mar. 1972, *NLGI Spokesman*.
W. H. Chappell et al., "Additives for Wear Resistance", Technical Report System No. 76-60, American Society for Metals.
W. H. Chappell et al., "Solid Lubricant Materials Phase III Final Report", Nov. 12, 1971, Prepared Under Contract No. N00156-70-C-1132 for Naval Air Development Center, Warminster, PA.
Muller et al., Zeitschrift fur anorganishe und allegemeine Chemie, Band 376, (1970), pp. 120-124.
Von A. Müller et al., Zeitschrift für anorganische und allegmeine Chemie, Band 371, 1969, pp. 134-148.
King, J. P. et al., "Solid Lubricants for Improved Wear Resistance", Final Report, ONR Contract N00014-79-C-305, Jul. 1982.
Clark et al., "Properties of Some Solid Tetrathiomolybdates," J. Inorg. Nucl. Chem. 28, pp. 381-385, (1966).
Chemical Abstracts, 93, 54851s, Harmer, M. et al., "Aqueous Solution Properties of Sulfido Complexes", (1980).
Chemical Abstracts, 89, 33480x, Mueller, A. et al., "Spectrographic Study of Some New Complex Anions of the Kind $[M(XS_4)_2]^{2-}$, $[M(XOS_3)_2]^{2-}$, and $[M(XO_2S_2)_2]^{2-}$, (1976).
Koeniger-Ahlborn, E. et al., "Coordinative Conditions in Bis(thiooxomolybdato)metallate (II) Complexes of the Type $[M(MoO_2S_2)_2]^{2-}$", "Angew. Chem. Internat. Edit. 13, No. 10, p. 672, (1974).

*Primary Examiner*—John Doll
*Assistant Examiner*—Jackson Leeds

[57] ABSTRACT

Complex metal chalcogenides which are useful for high temperature lubrication applications have the formula:

$$M_p(M'O_xA_{4-x})_m \cdot nH_2O$$

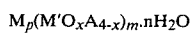

where M is a metal selected from the group consisting of: Mg, V, Mn, Fe, Co, Al, Cu, Ga, In, Bi, As, Ni, Zn, Cd, Sb, Sn and Ce;
where M' is a metal selected from the group consisting of Mo and W;
where A is S or Se;
where x ranges from 1 to 3;
where p is 1 or 2 depending on the oxidation state of M
where m ranges from 1 to 5 depending on the oxidation state of M;
and n ranges from 0 to 6.

10 Claims, No Drawings

COMPLEX METAL CHALCOGENIDES

BACKGROUND OF THE INVENTION

The Government has rights in this invention pursuant to Contract Number N00014-79-C-0305, awarded by the Department of the Navy.

This invention relates generally to complex metal chalcogenides and more specifically to certain oxygen containing chalcogenides which are useful in lubricant applications.

Chalcogens are defined as the elements that form Group VI of the periodic table including oxygen, sulfur, selenium, tellurium and polonium.

Chalcogenides are binary compounds containing a chalcogen and a more electropositive element or radical.

Complex metal chalcogenides such as $K_2MoOS_3$, $K_2WOS_3$, $Cs_2WOS_3$, and $Cs_2MoOSe_3$ have been described in the literature, for example, by V. A. Muller et al. *Z. Anorg. Und. Allgem. Chem.*, 371, p. 134–148 (1969). I have found that such compounds possess desirable lubricating properties. However, due to their water solubility, such compounds have limited utility in lubricant applications because they can be leached out of the lubricants when, for example, condensed moisture comes in contact with the lubricants. I have now prepared a group of complex metal chalcogenides which are useful for high temperature lubricant applications and are not water soluble. These chalcogenides provide lubricants having superior antiwear properties especially for certain stainless steels.

BRIEF SUMMARY OF THE INVENTION

In accordance with this invention, there are provided complex metal chalcogenides having the formula:

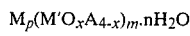

$$M_p(M'O_xA_{4-x})_m \cdot nH_2O$$

where M is a metal selected from the group consisting of Mg, V, Mn, Fe, Co, Al, Cu, Ga, In, Bi, As, Ni, Zn, Cd, Sb, Sn and Ce;
where M' is a metal selected from the group consisting of Mo and W;
where A is S or Se;
where x ranges from 1 to 3;
where p is 1 or 2 depending on the oxidation state of M and where m ranges from 1 to 5 depending on the oxidation state of M and where n ranges from 0 to 6.

DETAILED DESCRIPTION

Examples of specific complex metal chalcogenides of the invention include cesium oxythiomolybdate, antimony oxythiomolybdate, tin oxythiomolybdate, aluminum oxythiomolybdate, and zinc oxythiomolybdate. Some of the complex chalcogenides, for example cerium, do not have a specific integral atomic ratio but have a range of varying atomic ratios depending upon their method of preparation. The chalcogenides, unlike most solid lubricants which have layer-like crystalline structures, are amorphous solids. They are usually prepared in hydrated form and can then be partially dehydrated by heating above 100° C. In most cases complete dehydration of the chalcogenides is difficult, but the presence of water does not impair their lubricant properties. The chalcogenides of the invention have good temperature stability in air up to at least 400° C. and are not water soluble.

The complex metal chalcogenides are conveniently prepared by adding metal salts to solutions of ammonium or cesium oxythiomolybdate.

The invention is further illustrated by, but is not intended to be limited to, the following examples.

A. Preparation of Ammonium Oxythiomlybdate—$(NH_4)_2MoO_2S_2$

Ammonium oxythiomolybdate, $(NH_4)_2MoO_2S_2$, was prepared according to a published procedure (G. Kruss, *Ann. Chem.*, 225 (1884), F. W. Moore and M. L. Larson, *Inorg. Chem.*, 6 (5) 998–1003 [1967]) by treating an ammonium paramolybdate solution [10.0 grams of $(NH_4)_2Mo_7O_{24} \cdot 4H_2O$ dissolved in 60 ml of 3.3 normal ammonium hydroxide solution] with $H_2S$ at 4°–7° C. The resulting yellow solid was isolated by filtration under a nitrogen atmosphere and washed once with ice water and twice with 95% ethanol. After drying under a nitrogen stream, 17 grams of ammonium oxythiomolybdate, $(NH_4)_2MoO_2S_2$, was obtained.

B. Preparation of $Cs_2MoOS_3$

Cesium oxythiomolybdate, $Cs_2MoOS_3$, was prepared according to a published procedure (V. A. Muller, et al. *Z. Anorg. Und. Allgem Chem.*, 371, 136–148 [1969]). A mixture of 5.0 grams of sodium molybdate, $Na_2MoO_4 \cdot 2H_2O$, 9.1 grams of cesium acetate (15% excess) and 15 ml of 30% by weight ammonium hydroxide solution produced a solution having a pH of 12.8. The solution was acidified with 4.6 grams glacial acetic acid to lower the pH to 10 and then $H_2S$ was bubbled through the solution. An orange, crystalline solid formed which was isolated by filtration, washed with ethanol, and dried at 110° C. for five hours. The product weighed 9.0 grams (yield 92%).

Calculated for $Cs_2MoOS_3$: Cs, 56.4; Mo, 20.3; S, 20.3. Found: Cs, 54.2; Mo, 21.1; S, 21.9.

EXAMPLE 1

Preparation of $ZnMoO_2S_2 \cdot 3H_2O$

An aqueous solution of $ZnCl_2$ (5.4 grams in 50 ml of distilled water) was slowly added to a solution of $(NH_4)_2MoO_2S_2$ (9.0 grams in 100 ml of distilled water), which compound was prepared accordingly to procedure A. The reaction mixture was agitated for one hour at room temperature after complete addition of the $ZnCl_2$ solution. A black solid was collected on a filter, washed twice with distilled water and dried at 110° C. for three hours (6.6 grams 66% yield). X-ray diffraction study indicated that this material was amorphous.

Calculated for $ZnMoO_2S_2 \cdot 3H_2O$: Mo, 30.8; S, 20.6; Zn, 21.0. Found: Mo, 29.8; S, 23.4; Zn, 23.9.

EXAMPLE 2

Preparation of $ZnMoOS_3 \cdot 3H_2O$

An aqueous solution of 4.4 grams of $ZnCl_2$ in 30 ml of distilled water was slowly added to a solution of 15.4 grams of $Cs_2(MoOS_3)$, which was prepared according to procedure B, in 100 ml of distilled water at room temperature resulting in precipitation of a brown solid. The reaction mixture was refluxed for 1.5 hours and filtered. The solid product was washed several times with distilled water and dried at 105° C. for three hours.

The gray, solid product (10.2 grams) was amorphous as determined by X-ray diffraction.

Calculated for $ZnMoOS_3.3H_2O$: Mo, 29.3; S, 29.3; Zn, 19.9. Found: Mo, 30.9; S, 29.9; Zn, 23.4.

EXAMPLE 3

Preparation of $Ce_2(MoO_xS_{4-x})_3.nH_2O$

A solution of 19.8 grams of $CeCl_3.7H_2O$ in 82 ml of distilled water and a solution of 20.7 grams of $(NH_4)MoS_4$ in 152 ml of distilled water were added simultaneously to a flask under a nitrogen atmosphere. The resulting reaction mixture was refluxed for 4.5 hours with agitation and was then allowed to cool to room temperature. A brown solid was isolated by filtration and washed with distilled water, acetone and $CCl_4$, respectively. The solid product was dried at 95° C. for 12 hours following which it was found to weight 25 grams. The product was found to be amorphous by X-ray diffraction. A sample of the hydrated product was heated at 110° C. for 20 hours and then at 144° C. for 30 minutes, resulting in 2.4% and zero percent weight reduction, respectively. This would indicate that complete dehydration below 144° C. is difficult.

Calculated for $Ce_2(MoO_{1.2}S_{2.8})_3.6H_2O$: Ce, 28.2; Mo, 28.0; S, 27.1 (10.9% $H_2O$). Found: Ce, 30.3; Mo, 28.3; S, 26.3.

EXAMPLE 4

Preparation of $Ce_2(MoOS_3)_3$

A solution of 9.3 grams of $CeCl_3.7H_2O$ in 36 ml of distilled water was added dropwise to a hot solution of $Cs_2MoOS_3$, which was prepared according to procedure B, (17.7 grams in 150 ml of distilled water). The reaction mixture was refluxed for 1.5 hours after complete addition of the cerium chloride solution. The dark brown solid which deposited was isolated by filtration and washed with distilled water and acetone, respectively. The solid product was dried at 100° C. for six hours (dry weight=10.1 grams).

Calculated for $Ce_2(MoOS_3)_3$: Ce, 31.0; Mo, 31.8. Found: Ce, 31.7; Mo, 28.0.

EXAMPLE 5

Preparation of $Sb_2(MoOS_3)_3$

A solution of $(NH_4)_2MoS_4$ (10.3 grams dissolved in 100 ml distilled water) was combined with a solution containing 3.85 grams $Sb_2O_3$ and 46.5 grams 45% by weight KOH. The resulting solution was chilled below 5° C. and was added dropwise with hydrochloric acid solution (82 grams 37% by weight HCl diluted with 70 ml distilled water) under a nitrogen atmosphere at a temperature between 5° and 13° C. with agitation. A dark solid was deposited at the end of the addition of hydrochloric acid (pH 1-2). The solid was isolated by filtration and washed with distilled water, 95% EtOH and $CCl_4$, respectively. After drying under vacuum, a dark gray solid (13.2 grams) was obtained.

Calculated for $Sb_2(MoOS_3)_3$: S, 33.2; Mo, 33.1; Sb, 28.0. Found: S, 35.3; Mo, 29.3; Sb, 27.9.

EXAMPLE 6

Thermal Behavior

The complex metal chalcogenides show outstanding thermal stability. $ZnMoO_2S_2.3H_2O$ was selected for a detailed thermal study. Thermogravimetric analysis of $ZnMoO_2S_2.3H_2O$ was first carried out in air. Based on this compound's weight loss vs. temperature curve, it appears that complete removal of all three water molecules is difficult even at 350° C. A sample of $ZnMoO_2S_2.3H_2O$ was heated at 350° C. under a nitrogen atmosphere for two hours resulting in a weight loss of 9.1% (three water molecules represent 17.9%). X-ray diffraction study indicates that the partially dehydrated sample is still amorphous. TGA studies of the partially dehydrated sample were carried out both in air and nitrogen. The difference in the rates of weight loss vs. temperature between the sample heated in air and that heated in nitrogen is very slight (See Table I). For comparison, a TGA study of $MoS_2$ was also carried out in air. It is interesting to note that a rapid rate of weight loss for the $MoS_2$ sample occurs beyond 700° C. The residue of the $MoS_2$ sample at 1000° C. is less than 2% vs. 80% for the partially dehydrated $ZnMoO_2S_23H_2O$ sample. The initial weight losses of both $MoS_2$ and partially dehydrated $ZnMoO_2S_2.3H_2O$ samples occur at around 400° C.

TABLE I

THERMOGRAVIMETRIC ANALYSIS[1] OF PARTIALLY DEHYDRATED $ZnMoO_2S_2.3H_2O$ AND $MoS_2$

| | Temperature °C. | | | | | | | |
|---|---|---|---|---|---|---|---|---|
| | 200 | 400 | 500 | 600 | 700 | 800 | 900 | 1000 |
| Residue of Partially Dehydrated[2] $ZnMoOS_2.3H_2O$ in $N_2$, wt. % | 100 | 99 | 95 | 94 | 92 | 90 | 87 | 85 |
| Residue of Partially Dehydrated $ZnMoO_2S_2.3H_3O$ in Air, wt. % | 100 | 99 | 92 | 88 | 87 | 84 | 83 | 82 |
| Residue of $MoS_2$ in Air, wt. % | 100 | 100 | 96 | 91 | 89 | 4 | 3 | 2 |

[1]Heating rate = 5° min; air or nitrogen flow rate = 200 cc/min.
[2]A sample of $ZnMoO_2S_2.H_2O$ was first heated at 350° C. for 2 hours under $N_2$.

EXAMPLE 7

Lubricating Properties

The excellent lubricating properties, including extreme pressure and antiwear characteristics of these complex metal chalcogenides of the invention in two greases, was demonstrated in the Shell Four-ball EP and wear testers. Tables II and III list the weld points, load wear indices (LWI), and wear scar diameters of cerium and zinc oxythiomolybdates, respectively, when tested with balls made of two steel alloys, 52110 tool steel and stainless steel 440 (SS440). In addition, Table II also lists the wear scar diameters using the partially dehydrated forms of chalcogenides (after heating at 350° C. for two hours under $N_2$). The outstanding antiwear characteristics of the hydrated samples were not adversely affected by partial dehydration at 350° C. For comparison purposes, the lubricating properties of $MoS_2$ in the two greases were also determined and listed in Tables II and III.

TABLE II
LUBRICANT PROPERTIES OF OXYTHIOMOLYBDATE COMPLEXES

| Grease Composition | Weld Pt.[c] kg | LWI[c] | Wear Scar Diameter, mm[a] | | | |
|---|---|---|---|---|---|---|
| | | | Before Dehydration | | After Dehydration[b] | |
| | | | 52100 | SS 440 | 52100 | SS 440 |
| Lithium Grease (L.G.) | 140 | 18.3 | 0.70 | 3.96 | — | — |
| L.G. + 5% $MoS_2$ | 250 | 30.4 | 0.65 | 2.34 | — | — |
| L.G. + 5% $ZnMoOS_3.3H_2O$ | 315 | 52.0 | 0.44 | 0.53 | 0.50 | 1.50 |
| L.G. + $ZnMoO_2S_2.3H_2O$ | 315 | 60.6 | 0.40 | 0.84 | 0.48 | 0.61 |

[a] ASTM D-2266 1200 rpm, 167° F., and 40 kg for 1 hour
[b] The zinc complexes were dehydrated under $N_2$ at 350° C. for two hours.
[c] 52100 tool steel, ASTM D-2596

TABLE III
LUBRICATING PROPERTIES OF OXYTHIOLYBDATE COMPLEXES IN TWO DIFFERENT GREASES

| Grease Composition | AISI-52100 Balls | | | AISI-440 SS Balls | | |
|---|---|---|---|---|---|---|
| | Weld Pt.[1] kg | LWI[1] | Scar Diam.[2] mm | Weld Pt.[1] kg | LWI[1] | Scar Diam.[2] mm |
| Lithium Grease (L.G.) | 140 | 18.0 | 0.70 | 80 | 3.5 | 3.96 |
| L.G. + 5% $MoS_2$ | 250 | 30.4 | 0.65 | 100 | 6.1 | 2.34 |
| L.G. + 5% Ce Complex[3] | 250 | 41.4 | 0.40 | 100 | 10.4 | 1.38 |
| L.G. + 5% $Sb_2(MoOS_3)_3$ | 400 | — | — | — | — | — |
| Al Complex Grease (A.G.) | 100 | 11.8 | — | — | — | — |
| A.G. + 5% $MoS_2$ | 190 | 35.5 | — | — | — | — |
| A.G. + Ce Complex[3] | 200 | 40.2 | — | — | — | — |

[1] ASTM D-2596
[2] ASTM D-2266 - 1200 rpm, 167° F., 40 kg for 1 hour
[3] $Ce_2(MoO_{1.2}S_{2.8})_3.6H_2O$

I claim:
1. The compounds having the formula:

$$M_p(M'O_xA_{4-x})_m \cdot nH_2O$$

where M is a metal selected from the group consisting of: Mg, V, Mn, Fe, Co, Al, Cu, Ga, In, Bi, As, Ni, Zn, Cd, Sb, Sn and Ce;
where M' is a metal selected from the group consisting of Mo and W;
where A is S or Se;
where x ranges from 1 to 3;
where p is 1 or 2;
where m ranges from 1 to 5;
and n ranges from 0 to 6.

2. The compounds of claim 1 wherein M is selected from the group consisting of Zn, Sb, and Ce, M is Mo, and A is sulfur.

3. The compound of claim 2 wherein M is Zn and X is 1 or 2.

4. The compounds of claim 3 wherein n is 3.

5. The compounds of claim 2 wherein M is Sb.

6. The compounds of claim 2 wherein M is Ce.

7. The compound:

$$ZnMoO_2S_2 \cdot nH_2O$$

where n ranges from 0 to 3.

8. The compound $$ZnMoOS_3 \cdot nH_2O$$

where n ranges from 0 to 3.

9. The compound $$Ce_2(MoOS_3)_3 \cdot nH_2O$$

where n ranges from 0 to 6.

10. The compound $$Sb_2(MoOS_3)_3 \cdot nH_2O$$

where n ranges from 0 to 6.

* * * * *